United States Patent Office 2,728,638
Patented Dec. 27, 1955

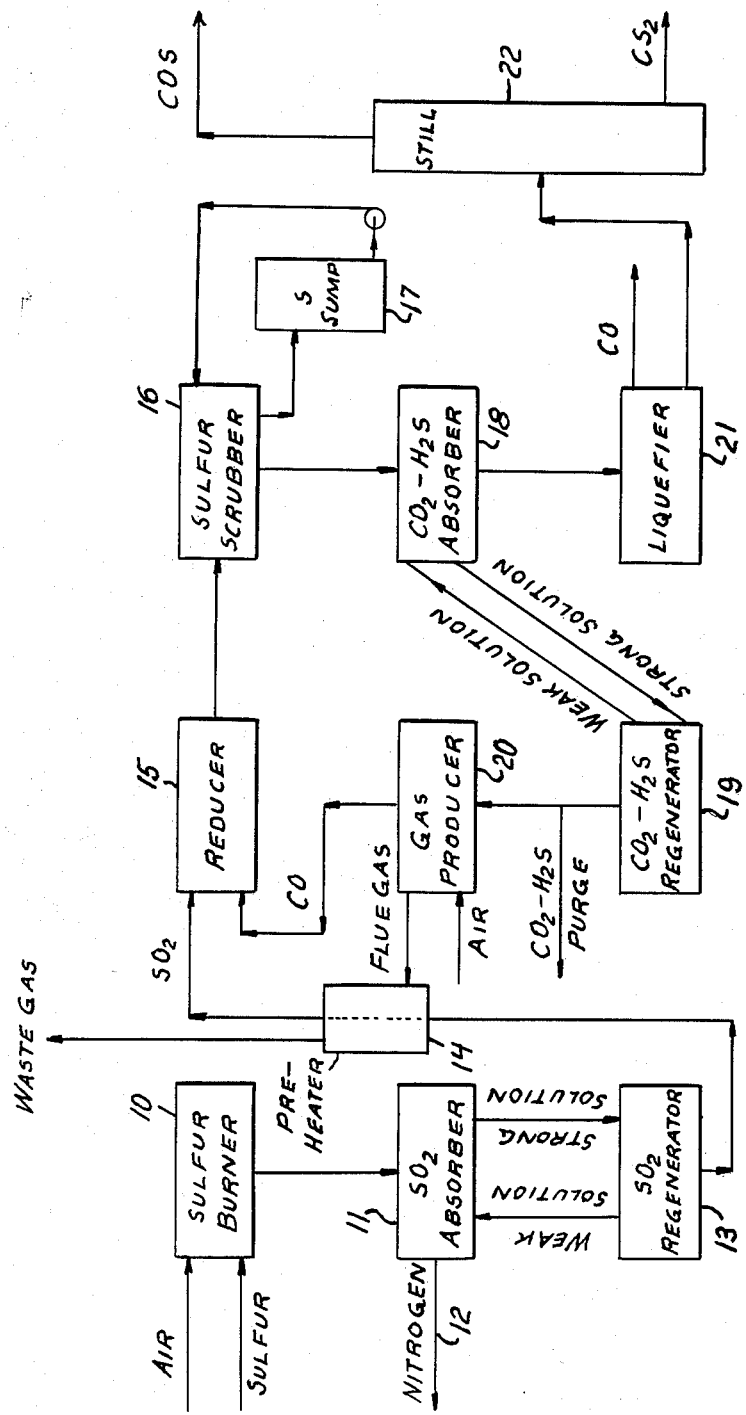
INVENTOR
RALPH E. MORNINGSTAR
BY
Adams, Forward and McLean
ATTORNEYS

2,728,638

PROCESS FOR THE MANUFACTURE OF CARBONYL SULFIDE

Ralph E. Morningstar, Columbus, Ohio, assignor to Olin Mathieson Chemical Corporation, a corporation of Virginia Application April 24, 1952, Serial No. 284,135

6 Claims. (Cl. 23—203)

This invention relates to the manufacture of carbonyl sulfide by the conversion of a mixture of sulfur dioxide and carbon monoxide by passage through a heated coke bed.

The technical literature is of very little assistance in the production of carbonyl sulfide as a product of commercial interest. Most references to carbonyl sulfide merely mention it as an undesirable by-product obtained in the reduction of sulfur dioxide to produce hydrogen sulfide or carbon bisulfide. Carbonyl sulfide however is a useful reagent with numerous advantages over comparable reagents. It reacts similarly to carbon dioxide in some reactions but under relatively mild conditions. For example, while carbon dioxide and ammonia form urea under high pressures and temperatures, carbonyl sulfide and ammonia form urea at atmospheric pressure and at considerably lower temperatures. Although carbonyl chloride frequently reacts similarly to carbon dioxide, hydrogen chloride is formed as a by-product. Carbonyl sulfide correspondingly produces hydrogen sulfide, a much less objectionable by-product.

The formation of carbonyl sulfide from carbon monoxide and sulfur dioxide has generally been represented by the equation:

$$3CO + SO_2 \rightarrow COS + 2CO_2$$

Some authors have suggested the formation of elemental sulfur as a necessary intermediate:

$$2CO + SO_2 \rightarrow S + 2CO_2$$

$$CO + S \rightarrow COS$$

I have found however that reaction of sulfur dioxide, carbon and carbon monoxide at high temperature results in the production of substantial yields of carbonyl sulfide provided the reaction time is closely limited. According to my invention, sulfur dioxide and carbon monoxide are passed through a body of particle-form coke which is maintained in a reaction zone at a temperature of from about 1400° to 2000° F., but more advantageously from about 1400° to 1800° F. Reaction time is controlled by the space velocity of the reacting mixture through the body of coke which is maintained between about 100 min.$^{-1}$ and about 3 min.$^{-1}$ but preferably between about 20 min.$^{-1}$ and 5 min.$^{-1}$. In a particularly advantageous method of conducting the operation, carbon monoxide is formed for charging with the sulfur dioxide to the body of coke by separating carbon dioxide produced as a by-product of the reaction from the effluent reaction mixture and converting it to carbon monoxide.

According to the present invention it is essential to introduce preformed carbon monoxide with the sulfur dioxide to be converted to carbonyl sulfide and the mixture is passed through a heated coke bed at a rate and temperature which prevents the formation of an equilibrium mixture of the reactants and products. When the space velocity is too low or the temperature too high, an equilibrium mixture of hydrogen sulfide, sulfur and sulfur dioxide results which while suitable for conversion to elemental sulfur, contains relatively small proportions of carbonyl sulfide. In contrast to prior efforts to recover sulfur by the initial preparation of such an equilibrium mixture of gases, the present invention provides means for obtaining a non-equilibrium gas mixture rich in carbonyl sulfide which is removed from the reaction zone and separated before decomposition of carbonyl sulfide occurs.

One important feature of the invention is the discovery that a gas mixture containing large proportions of carbonyl sulfide can be obtained provided the space velocity of the reacting mixture through the hot coke bed does not exceed about 100 min.$^{-1}$ and is not less than about 3 mins.$^{-1}$ calculated with the gases at standard temperature and pressure. Corresponding space velocities for any particular temperatures and pressures obtaining in the coke bed are readily calculated. Within these limits carbonyl sulfide is formed from sulfur dioxide and carbon monoxide at a commercially feasible rate and the gaseous mixture is removed from the reaction zone before further reaction to form elemental sulfur occurs. Under these conditions, with suitable proportions of reacting gases and at suitable temperatures in the coke bed, as discussed below, up to about 85% or more of the sulfur charged as sulfur dioxide is converted to recoverable carbonyl sulfide.

Within the limits set forth space velocities of from about 5 to about 20 min.$^{-1}$ are preferred. If the space velocity falls below about 3 min.$^{-1}$ the reactions proceed beyond the point at which the gas contains maximum proportions of carbonyl sulfide and larger proportions of elemental sulfur are formed. On the other hand when space velocities exceed about 100 min.$^{-1}$ the gas mixture will not contain the maximum proportions of carbonyl sulfide which otherwise can be obtained.

Using space velocities within the recited range, the optimum temperature of reaction is in the range of from about 1400 to 1800° F. although temperatures as high as about 2000° F. may be employed. At the higher space velocities it is important to maintain the bed at a temperature near the upper end of the temperature range, e. g., about 1700° F. whereas with lower space velocities, lower temperatures of the order of about 1500° F. are suitable. Various means may be used to maintain the preferred temperature in the coke bed. For example, an external source of heat may be used and the heat of combustion of an extraneous source of fuel may be transferred through the reaction chamber to the coke contained therein. Preferably, however, the reacting gases are preheated to a sufficient degree that the heat of reaction serves to maintain the coke bed in the desired temperature range.

The character of the carbonaceous charge to the reaction zone appears to have a material effect on the reactions involved. Calcined wood charcoal gives the highest conversions and is therefore preferred. Uncalcined wood charcoal can be used satisfactorily but contains somewhat higher proportions of hydrogen than the calcined wood charcoal. Where the carbonaceous charge contains considerable amounts of hydrogen, it is difficult to avoid the formation of hydrogen sulfide which reacts with sulfur dioxide to form elemental sulfur thus reducing the yield of carbonyl sulfide. For this reason coke produced in by-product coke ovens is less satisfactory. Moreover, its carbon content appears to be less effective requiring an appreciably higher temperature e. g. about 2000–2200° F., for optimum conversion of sulfur dioxide to carbonyl sulfide. Treatment of the by-product coke by neutralization and saturation with aqueous sodium carbonate however has been found to render the coke more efficacious in the present process. In addition, petroleum coke resulting from cracking operations in which coke is produced, as well as some samples of coke derived from acid sludge have been found satisfactory.

As noted above, it is important to admix the carbon monoxide with sulfur dioxide prior to introduction to the coke bed or to introduce both gases to the reaction chamber at substantially the same point.

It is also important to introduce the reacting gases in equimolecular proportions to obtain the most advantageous results. Some deviation from this ratio is permissible but in order to recover substantially all the sulfur charged as sulfur dioxide, at least 1 mol of carbon monoxide is required per mol of sulfur dioxide. More carbon monoxide is of little advantage but is not disadvantageous. While a molar ratio of from 0.5 to 2 mols of carbon monoxide per mol of sulfur dioxide may be used I prefer to use a molar ratio of about 1—1.

My experimental findings show that the simultaneous presence of carbon monoxide, sulfur dioxide and coke at a reacting temperature is essential to the rapid formation of carbonyl sulfide, perhaps by the following mechanism:

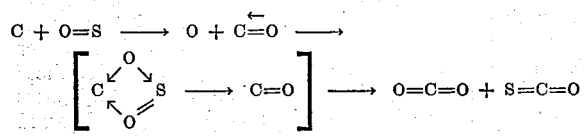

Thus an intermediate complex of carbon, sulfur dioxide and carbon monoxide may be formed when all three components are simultaneously present at reacting temperatures, but the complex once formed is unstable and immediately dissociates into carbon dioxide and carbonyl sulfide. Both reactions appear to be very rapid under the prescribed conditions so that carbonyl sulfide can be obtained in excellent conversions provided it is promptly removed from the reaction zone before it reacts further, for example, with additional sulfur dioxide to form carbon dioxide and elemental sulfur. Hence it is important to limit and control space velocity in accordance with the reaction temperature.

Sulfur dioxide for the process may be obtained from any convenient source such as the burning of sulfur, pyrites or other sulfur-bearing ores or may be recovered from waste gases from other operations. Alternatively it may be obtained by the burning of hydrogen sulfide or from any other convenient source. Carbon monoxide is conveniently obtained from a gas producer utilizing carbon dioxide and coke. Advantageously the carbon dioxide is removed from the carbonyl sulfide-containing product gas and is returned through the gas producer to reduce it to carbon monoxide. In this way all of the carbon appearing in the carbonyl sulfide product (and in the minor amounts of by-product carbon bisulfide) are derived from the coke charged to the gas producer.

The reactant gases preferably are used in concentrated form. Thus the sulfur dioxide charge gas advantageously is separated in concentrated form from nitrogen introduced with air to the sulfur burner. Without concentrating the sulfur dioxide, the recovery of carbonyl sulfide is somewhat more difficult and less efficient because of the large proportion of diluent nitrogen. Furthermore, it is necessary to heat and cool the diluent nitrogen along with the reactant gases which decreases capacity and increases unit costs.

A particularly advantageous mode of operation is shown in the accompanying drawing, which illustrates the major operation in simplified diagrammatic form without showing operational details or auxiliary operations such as heat recovery and the like. Sulfur is charged to a sulfur burner 10 and converted to sulfur dioxide with air. The effluent gas is scrubbed with a suitable absorbent, for example, dimethyl aniline, in absorber 11 to remove the sulfur dioxide from the gas. Residual nitrogen is discharged as by line 12, and the strong solution is regenerated as in regenerator 13 by means of heat. The weak solution is returned to absorber 11. The strong sulfur dioxide gas is passed, advantageously through heat exchanger 14 to the reducer 15 containing a suitable coke bed. Carbon monoxide is also introduced to reducer 15 and admixed with the sulfur dioxide before passing through the heated portion of the coke bed. The effluent gas containing primarily carbonyl sulfide and carbon dioxide but with minor proportions of carbon bisulfide, sulfur, hydrogen sulfide and carbon monoxide is passed through a sulfur scrubbing tower 16. Liquid sulfur is circulated from sump 17 through the tower 16 to scrub out elemental sulfur obtained as a by-product. The residual gas is passed to an absorber 18 for acid gases which may use, for example, monoethanolamine, as absorbent. Carbon dioxide with residual hydrogen sulfide is regenerated from the strong absorbent in regenerator 19 and the resulting gases are passed to a gas producer 20 charged with heated coke. The carbon dioxide is reduced to carbon monoxide and returned to reducer 15. During heating periods in the gas producer bed, air is admitted and the resulting combustion products discharged may be utilized as a heat exchange medium in exchanger 14. The effluent gas from the absorber 18 now free from acid gases and comprising principally carbonyl sulfide with minor amounts of carbon bisulfide and carbon monoxide is liquefied in liquefier 21 at a suitable temperature to condense both carbonyl sulfide and carbon bisulfide. Any residual carbon monoxide in the gas is discharged or recycled. The liquid mixture is fractionated in still 22 to remove carbonyl sulfide overhead and carbon bisulfide in the bottoms.

The following examples illustrate results of test operations under various conditions which however are not intended to be other than illustrative.

*Example I*

A gaseous mixture of 746 ml. per minute of sulfur dioxide and 747 ml. per min. of carbon monoxide was admitted to a 1¾" deep bed of uncalcined wood charcoal in a porcelain tube 2" in diameter. The bed was maintained at a temperature of about 1470° F. The space velocity was 16.6 min.$^{-1}$. The exit gas contained 470 ml. per minute of carbonyl sulfide, 620 of carbon dioxide, 529 of carbon monoxide and lesser proportions of sulfur, carbon bisulfide and hydrogen sulfide. The conversion of sulfur dioxide to carbonyl sulfide was 63%.

*Example II*

A gaseous mixture of 748 ml. per minute of sulfur dioxide and 752 ml. per minute of carbon monoxide was passed through a bed of calcined wood charcoal one inch in diameter and ten inches deep. The temperature in the bed was 1615° F. Conversion to carbonyl sulfide was 70%.

*Example III*

A mixture of 251 ml. per minute of sulfur dioxide and 250 ml. per minute of carbon monoxide was passed through a bed of uncalcined charcoal of the same dimensions as in Example II at 1463° F. The space velocity was 3.9 min.$^{-1}$. About 74% of the sulfur dioxide was converted to carbonyl sulfide. The exit gas contained large proportions of carbon monoxide and carbon dioxide with minor proportions of sulfur, hydrogen sulfide and carbon bisulfide.

*Example IV*

When the same flow rates, bed size and proportions of reactant gases were used as in Example III but with calcined wood charcoal at 1520° F., conversion of sulfur dioxide to carbonyl sulfide was 82% and the proportion of hydrogen sulfide formed was about half that of Example III.

Example V

Calcined petroleum coke under the same conditions of flow as in Examples III and IV showed a 66% conversion of sulfur dioxide to carbonyl sulfide at 1835° F.

Example VI

Crushed by-product coke was boiled in a 10% solution of soda ash until the coke sank into the solution. It was dried and charged to the same apparatus used in the preceding examples. At the same flow rates, catalyst bed dimensions and space velocity but at a temperature of 1787° F., conversion of sulfur dioxide to carbonyl sulfide was 69%.

Example VII

Using a one inch bed of calcined wood charcoal at 1470° F., 2500 ml. of sulfur dioxide and 2500 ml. of carbon monoxide per minute were introduced at a space velocity of 95 min.$^{-1}$ to produce an exit gas which contained carbonyl sulfide representing a conversion of 64.3%.

Example VIII

A 2 inch deep, 1¾ inch bed of sludge coke at 1795° F. was treated with 750 ml. per minute of sulfur dioxide and an equal amount of carbon monoxide. Space velocity was 19 min.$^{-1}$. Conversion to carbonyl sulfide was about 45%.

I claim:

1. In the manufacture of carbonyl sulfide from sulfur dioxide, carbon and carbon monoxide the process which comprises passing sulfur dioxide and carbon monoxide simultaneously in a ratio of sulfur dioxide to carbon monoxide between 0.5:1 and 2:1 through a body of particle-form coke maintained in a reaction zone at a temperature from about 1400° to 2000° F. while controlling the space velocity between about 100 min.$^{-1}$ and 3 min.$^{-1}$.

2. In the manufacture of carbonyl sulfide from sulfur dioxide, carbon and carbon monoxide the process which comprises passing sulfur dioxide and carbon monoxide simultaneously in a ratio of sulfur dioxide to carbon monoxide between 0.5:1 and 2:1 through a body of particle-form calcined wood charcoal maintained in a reaction zone at a temperature from about 1400° to 2000° F. while controlling the space velocity between about 100 min.$^{-1}$ and 3 min.$^{-1}$.

3. In the manufacture of carbonyl sulfide from sulfur dioxide, carbon and carbon monoxide the process which comprises passing sulfur dioxide and carbon monoxide simultaneously in a ratio of sulfur dioxide to carbon monoxide between 0.5:1 and 2:1 through a body of particle-form calcined wood charcoal maintained in a reaction zone at a temperature from about 1400° to 2000° F. while controlling the space velocity between about 20 min.$^{-1}$ and 5 min.$^{-1}$.

4. In the manufacture of carbonyl sulfide from sulfur dioxide, carbon and carbon monoxide the process which comprises passing sulfur dioxide and carbon monoxide simultaneously in a ratio of sulfur dioxide to carbon monoxide between 0.5:1 and 2:1 through a body of particle-form coke maintained in a reaction zone at a temperature from about 1400° to 2000° F. while controlling the space velocity between about 100 min.$^{-1}$ and 3 min.$^{-1}$, separating carbon dioxide from the resulting reaction mixture, recovering carbonyl sulfide from the reaction mixture, converting the carbon dioxide to carbon monoxide and charging the resulting carbon monoxide with fresh sulfur dioxide to the body of particle-form coke maintained in the reaction zone.

5. In the manufacture of carbonyl sulfide from sulfur dioxide, carbon and carbon monoxide the process which comprises passing substantially equimolecular amounts of sulfur dioxide and carbon monoxide simultaneously through a body of particle-form coke maintained in a reaction zone at a temperature from about 1400° to 2000° F. while controlling the space velocity between about 100 min.$^{-1}$ and 3 min.$^{-1}$.

6. In the manufacture of carbonyl sulfide from sulfur dioxide, carbon and carbon monoxide the process which comprises passing substantially equimolecular amounts of sulfur dioxide and carbon monoxide simultaneously through a body of particle-form calcined wood charcoal maintained in a reaction zone at a temperature from about 1400° to 2000° F. while controlling the space velocity between about 20 min.$^{-1}$ and 5 min.$^{-1}$.

References Cited in the file of this patent

UNITED STATES PATENTS

| | | |
|---|---|---|
| 1,350,858 | Dow et al. | Aug. 24, 1920 |
| 2,080,360 | Lepsoe | May 11, 1937 |
| 2,443,383 | Gamble et al. | June 15, 1948 |

OTHER REFERENCES

Ind. and Engineering Chemistry (November 1950), pages 2264 and 2265.